US006970076B1

(12) United States Patent
Starkey

(10) Patent No.: US 6,970,076 B1
(45) Date of Patent: Nov. 29, 2005

(54) METHOD AND APPARATUS FOR COMMUNICATION OF DATA IN A REMOTE TIRE MONITORING SYSTEM

(75) Inventor: Fred L. Starkey, Monroe, NC (US)

(73) Assignee: Schrader-Bridgeport International, Inc., Buffalo Grove, IL (US)

(*) Notice: Subject to any disclaimer, the term of this patent is extended or adjusted under 35 U.S.C. 154(b) by 515 days.

(21) Appl. No.: 09/758,668

(22) Filed: Jan. 11, 2001

Related U.S. Application Data

(60) Provisional application No. 60/176,165, filed on Jan. 14, 2000.

(51) Int. Cl.$^7$ .............................................. B60C 1/00
(52) U.S. Cl. ..................... 340/445; 340/442; 340/447; 340/539.1; 73/146.5
(58) Field of Search ................... 340/445, 442, 340/438, 447, 539.1, 539.22; 73/146.2, 146.4, 73/146.5, 146.8

(56) References Cited

U.S. PATENT DOCUMENTS

| | | | | |
|---|---|---|---|---|
| 3,818,435 A | 6/1974 | Hill et al. | ................... | 340/447 |
| 3,858,174 A | 12/1974 | Harris | ........................ | 340/447 |
| 3,938,077 A | 2/1976 | Nakanishi et al. | .......... | 340/447 |
| 4,186,377 A | 1/1980 | Barabino | .................... | 340/447 |
| 4,510,484 A | 4/1985 | Snyder | ...................... | 73/146.5 |
| 4,588,978 A | 5/1986 | Allen | ....................... | 73/146.5 |
| 4,597,286 A | 7/1986 | Aguglia | ...................... | 340/447 |
| 4,953,393 A | 9/1990 | Galasko et al. | ............. | 73/146.5 |
| 4,996,716 A | 2/1991 | Potter et al. | .................. | 455/41 |
| 5,196,845 A | 3/1993 | Myatt | ......................... | 340/448 |
| 5,260,683 A | 11/1993 | Tanaka et al. | .............. | 340/448 |
| 5,285,189 A * | 2/1994 | Nowicki et al. | ............ | 340/447 |
| 5,289,160 A * | 2/1994 | Fiorletta | ..................... | 340/447 |
| 5,500,065 A | 3/1996 | Koch et al. | ................. | 156/123 |
| 5,553,491 A | 9/1996 | Naito et al. | ................ | 73/146.5 |
| 5,596,141 A | 1/1997 | Nishikawa et al. | ........ | 73/146.2 |
| 5,600,301 A | 2/1997 | Robinson, III | ............. | 340/442 |
| 5,661,651 A * | 8/1997 | Geschke et al. | ...... | 364/424.034 |
| 5,753,809 A * | 5/1998 | Ogusu et al. | ............... | 73/146.2 |
| 5,801,305 A | 9/1998 | Kawai et al. | .............. | 73/146.2 |
| 5,826,207 A | 10/1998 | Ohashi et al. | .............. | 340/444 |
| 5,945,908 A * | 8/1999 | Nowicki et al. | ............ | 340/447 |
| 6,169,480 B1 * | 1/2001 | Uhl et al. | ................... | 340/442 |
| 6,271,748 B1 * | 8/2001 | Derbyshire et al. | ......... | 340/442 |
| 6,292,095 B1 * | 9/2001 | Fuller et al. | ................ | 340/442 |
| 6,362,732 B1 * | 3/2002 | Konchin et al. | ............ | 340/446 |

* cited by examiner

*Primary Examiner*—Davetta W. Goins
(74) *Attorney, Agent, or Firm*—Brinks Hofer Gilson & Lione

(57) ABSTRACT

A tire monitor (100) mountable inside a tire (200) includes a tire data sensor (402) and a transmitter (406). The transmitter is configured to transmit tire data at one or more frequencies within a passband of frequencies of the tire. The transmitter of the tire monitor is tuned in relation to the characteristic frequency response of the tire to ensure reliable transmission and reception of radio signals conveying the tire data to a remote receiver.

23 Claims, 2 Drawing Sheets

METHOD AND APPARATUS FOR COMMUNICATION OF DATA IN A REMOTE TIRE MONITORING SYSTEM

This application claims the benefit of Provisional application Ser. No. 60/176,165, filed Jan. 14, 2000.

BACKGROUND

This invention relates to radio communication of data such as in a remote tire monitoring system of a vehicle.

U.S. Pat. No. 5,600,301, assigned to the assignee of the present invention, discloses a tire pressure monitoring system that includes sending units associated with each tire of a vehicle and a central receiving unit. Each of the sending units senses tire pressure and transmits a radio frequency (RF) signal. The RF signal includes an identifier and an indication of tire pressure. The receiving unit receives the RF signal and decodes the identifier and the tire pressure indicator. Abnormal tire pressure conditions may be identified for the user in this manner.

The tire monitors in such a system are conventionally mounted on the wheels of the vehicle within the tire. The tire monitor is enclosed within a housing within the tire. A valve stem is integrally associated with the tire monitor and extends through a hole in the wheel. In some cases, the valve stem is used to form an antenna for transmission of the RF signal.

This system has worked well in use with tires having sidewalls made of synthetic materials. Tire manufacturers, however, are developing tires having metal such as steel in the walls of the tires. Such tires are referred to as runflat because they provide the capability to continue travelling even when deflated. This is done by increasing the strength of the sidewall by steel reinforcement.

It has been discovered that conventional tire monitoring systems do not work well in use with such metallic ply construction tires. The transmitted signal is severely attenuated and is not received reliably or at all by the system receiver. This is a particular concern with runflat tires because the user may not be aware of a reduced pressure or flat tire condition without the tire pressure monitoring system's warning.

U.S. Pat. No. 4,953,393 discloses a tire monitor including a passive monitoring means having a characteristic resistance, inductance and capacitance, creating a natural frequency of oscillation. Variations in tire pressure will change the inductance or capacitance, thereby changing the natural frequency of oscillation. The monitoring means is electrically excited and the variable oscillation frequency is used to determine tire pressure. However, no accommodation is made for the characteristic frequency response of the tire due to metallic components.

U.S. Pat. No. 5,569,141 discloses a tire pressure monitoring system in which a tire vibration frequency components are derived from signals indicating wheel speed. Using resonance frequencies, tire pressure can be detected. However, again no accommodation is made for the frequency response of the tire when it includes metallic components which limit or attenuate radio transmission.

Accordingly, there is a need for a method and apparatus insuring reliable transmission and reception of data such as tire data for use with metallic ply tires.

SUMMARY

By way of introduction only, the preferred embodiment described below provides an improved method and apparatus for transmission of tire data from a tire monitor mounted on a wheel with a metallic ply sidewall tire. The tire has a characteristic frequency response in which some frequencies are passed and some frequencies are attenuated.

The disclosed tire monitor includes a transmitter configured to transmit data at a transmission frequency chosen in relation to the characteristic frequency response of the tire. Tires of the type used with the tire monitor are characterized for frequency response to produce frequency response data for the individual tire or model of tire. The frequency response indicates one or more attenuation bands of frequencies where transmission by the tire monitor is attenuated. The frequency response further indicates one or more passbands of frequencies where transmission by the tire monitor is not attenuated or only minimally attenuated by the tire. The transmission frequency for the tire monitor is then chosen based on the frequency response data so that the transmission frequency of the tire monitor is located within one of the passbands of the tire.

The foregoing discussion of the preferred embodiment has been provided only by way of introduction. Nothing in this section should be taken as a limitation on the following claims, which define the scope of the invention.

DETAILED DESCRIPTION OF THE PRESENTLY PREFERRED EMBODIMENTS

Figure 1:
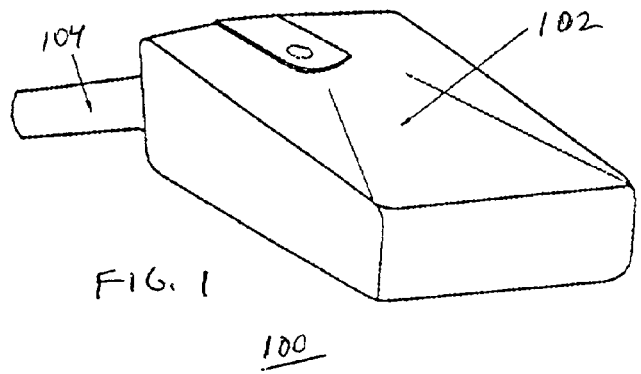
FIG. 1 is a perspective view of a tire monitor.

Referring to the drawings, FIG. 1 shows a perspective view of a tire monitor 100. The tire monitor 100 includes a housing 102 and a valve stem 104. The tire monitor 104 is configured for mounting on a wheel of a vehicle. When so mounted, the tire monitor 100 senses a tire characteristic and produces tire data representative of the tire characteristic. In the preferred embodiment, the tire monitor 100 senses air pressure of the tire. The valve stem 104 opens to admit air for filling the tire and for manual checks of tire pressure. Otherwise, the valve stem 104 generally remains closed to seal the tire. The housing 102 contains mechanical and electrical components for detecting tire pressure or other tire characteristics and producing an indication thereof. Structure and operation of the tire monitor 100 will be provided in further detail in connection with FIG. 4 below.

Figure 2:
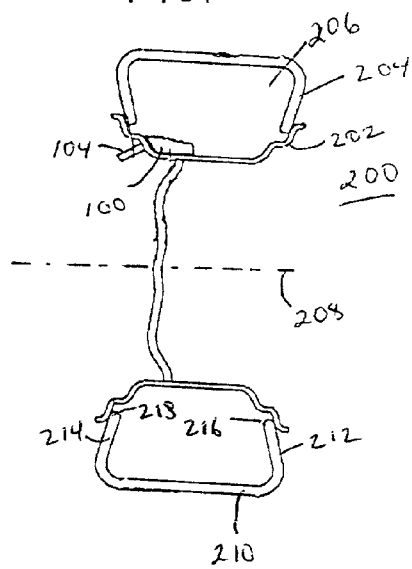
FIG. 2 is a cross-sectional view of a wheel of a vehicle.

FIG. 2 is a cross sectional view of a wheel 200 of a vehicle. The wheel 200 includes a rim 202 and a tire 204 mounted thereon. A tire monitor 100 is mounted on the wheel 200 for monitoring a tire characteristic, such as tire pressure. The tire monitor 100 is mounted within a cavity 206 formed between the rim 202 and the tire 204 so that only the valve stem 104 extends outside the cavity 206. When mounted on a vehicle, the wheel 200 rotates about a centerline 208.

In the illustrated embodiment, the tire 200 is a steel ply sidewall tire capable of operation even when the tire 200 has a puncture or has insufficient air pressure for proper inflation. The tire 200 includes a tread region 210, a first or inner sidewall 212 and a second or outer sidewall 214. The inner sidewall terminates in an inner bead 216. The outer sidewall terminates in an outer bead 218. Sizing and proportions of tires will vary, including the aspect ratio or ratio between the sidewall height and tread width, from that illustrated in FIG. 2 without affecting suitability of the tire for use in conjunction with the tire monitor 100.

To provide runflat capability, metallic reinforcing members (not shown) are included in the sidewalls 212, 214. In one known runflat tire, metal reinforcement is provided by steel wires which run longitudinally the entire width of the tire. These wires extend from the inner bead 216, through the inner sidewall 212 and the tread region 210, through the outer sidewall 214 to the outer bead 218. The metal wires are closely positioned circumferentially in the tire to provide support and reinforcement even when the tire 200 lacks sufficient air for inflation. The wires may be encased in rubber or other electrical insulator. In many applications, the tire 200 further includes steel belts or other metallic structures in the tread region 210 for puncture resistance.

In one embodiment, a vehicle including tires such as the tire 200 also includes a remote tire monitor system. Such a system includes a plurality of tire monitors associated with wheels of the vehicle. Each wheel includes a tire and tire monitor mounted therein, as the tire monitor 100 is mounted in the tire 200. Each tire monitor includes a transmitter configured to transmit tire data at a transmission frequency. The tire monitor system further includes a receiver configured to receive the tire data. The receiver may be part of a control unit which is configured to produce a user indication of a tire condition, such as a low tire pressure warning. Such a tire monitor system is disclosed in U.S. Pat. No. 5,600,301 which is commonly assigned with the present patent application and incorporated herein by reference.

Figure 3:
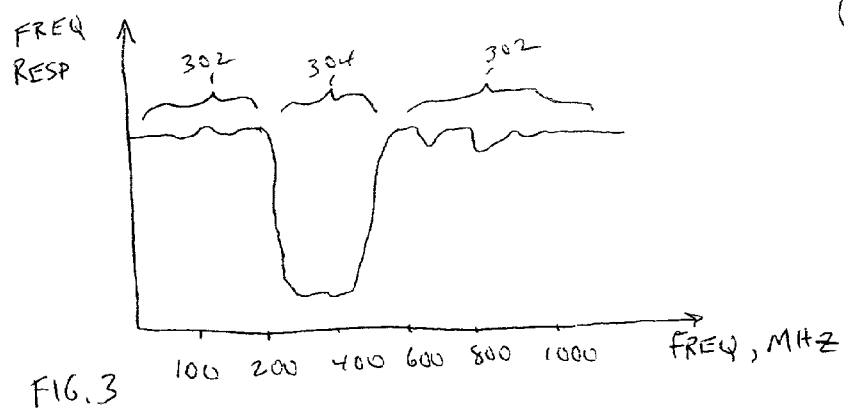
FIG. 3 illustrates frequency response of the tire of FIG. 2.

FIG. 3 is a plot illustrating characteristic frequency response of the tire 200 of FIG. 2 to radio transmissions of selected frequency. The characteristic frequency response represents the tire's inherent reaction to electromagnetic energy imparted on the tire. Some frequencies will be absorbed or otherwise attenuated by the tire. Other frequencies will be passed with little or no attenuation. In particular, FIG. 3 illustrates the attenuation or transmission of electromagnetic energy by the tire 200 from a transmitter located inside the tire, as in the position of the tire monitor 100 of FIG. 2, to a receiver outside the tire.

One technique for determining characteristic frequency response for a tire involves comparing frequency attenuation of an environment both with and without the tire present. First a transmitter is placed in a test environment. A reference sweep of the test environment is performed using a spectrum analyzer. That is, the transmitter is caused to transmit radio energy at predetermined transmit power across a predetermined band of frequencies. A resulting frequency characteristic is stored. The frequency response determination continues by placing a tire in the environment and the transmitter inside the tire and sweeping the spectrum analyzer through frequencies of interest. The resulting frequency characteristic is stored. A difference function of the spectrum analyzer on the two store frequency characteristics produces an approximation of the frequency response of the tire. In a proper frequency response measurement, alternative transmission paths such as through the valve stem hole in the wheel, are blocked.

Other techniques of determining the characteristic frequency response may be employed as well, including analytical techniques of computing the frequency response based on input data about such features as tire construction, size, etc.

As can be seen in FIG. 3, the characteristic frequency response for the tire includes both passbands 302 and attenuation bands 304 of frequencies. There is an attenuation band between about 200 MHz and 600 MHz in this non-limiting example. The inventor has determined that for the particular tire illustrated in FIG. 3, the tire's passage or transmission of radio frequency energy rolls off sharply in the band conventionally used for remote tire pressure monitoring systems, in the vicinity of 300 MHz. For one model of tire, on a spectrum analyzer sweep from 200–400 MHz, the tire attenuates about 15 dbm more at 315 MHz than in the range from 200 to 290 MHz. 315 MHz is one frequency used for tire monitors installed in conventional tires. A competitor's tire monitor transmits at 355 MHz, which exhibited a few dB less attenuation but still greater than 10 dB attenuation. Attenuation in the region around 300 MHz is as much as 25 dBm. The frequency response is fairly constant outside the range from about 200 MHz to 600 MHz. Thus, there is a passband below about 200 MHz and there is a passband above about 600 MHz.

Accordingly, the tire 200 is acting as a notch filter. The steel sidewall plies of the tire 200 are composed of individual strands of metal such as steel wires which traverse the tire from the inner bead 216 to the outer bead 218. These strands are completely surrounded by synthetic material or rubber and are thus insulated from one another. The overall length of each strand is about one-half wave length for radio frequency energy in the region of 300 MHz. Each strand behaves as a tuned director or reflector of electromagnetic energy in this frequency region. This results in a frequency response approximating a notch filter, as illustrated in FIG. 3. This has been observed in tires having a variety of aspect ratios, the ratio between the height of the sidewall 212, 214 and the width of the tread region 210. The inventor has determined that the length of the metal strand or belt or region in the sidewalls 212, 214 and the tread region 210 have an important effect on frequency response of the tire. Frequency response is relatively independent of the aspect ratio of the tire. That is, the relative lengths of sidewall portions of the metallic wires in the tire and the tread portion of the metallic wires does not significantly impact tire frequency response.

Each tire has a characteristic frequency response. In particular some runflat or metallic ply sidewall tires, such as the tire 200 of FIG. 2, have a characteristic frequency response similar to that of a notch filter, as illustrated in FIG. 3. The characteristic frequency response is related to the structure of the tire, the materials chosen for tire construction and the interaction of these materials with radio frequency energy transmitted by a tire monitor 100 within the tire 200.

Each tire or model of tire will have a characteristic frequency response. A tire having synthetic sidewalls, rather than metal ply sidewalls, will have a different characteristic frequency response than the frequency response illustrated in FIG. 3. A different sized tire, having longer metal strands or belts than the tire 200 of FIG. 2 will have a notch filter-type frequency response with the attenuation region shifted to the right, to higher frequencies of attenuation. In general, the characteristic frequency response of the tire will include at least one passband and at least one attenuation band of frequencies. In the at least one passband, radio frequency energy is not attenuated or attenuated only slightly. In the at least one attenuation band of frequencies, radio frequency energy is substantially attenuated. The attenuation in the attenuation band is enough to interfere with reliable reception of the radio signal and a receiver on the vehicle.

Figure 4:
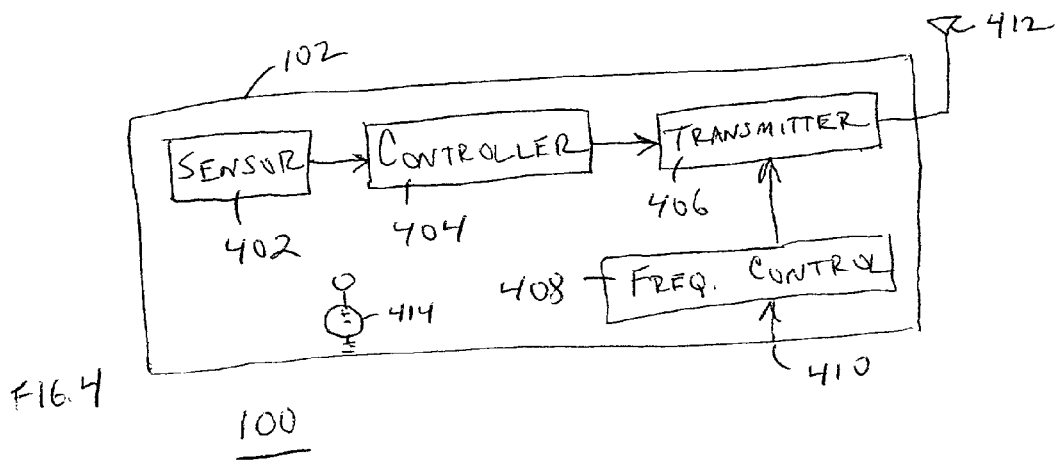
FIG. 4 is a block diagram of a tire monitor.

FIG. 4 is a block diagram of a tire monitor 102. In the illustrated embodiment, the tire monitor 100 includes a pressure sensor 402, a controller 404, a transmitter 406, a frequency control circuit 408 and an antenna 412. The tire monitor 100 further includes a battery 414 for powering the tire monitor 100. The components of the tire monitor 100 are contained within a housing 102. In alternative embodiments, the tire monitor 100 may include or omit various of these components to suit a particular application. In addition, the tire monitor may further include components such as a roll switch or magnetically actuated switch or receiver for providing two-way communication and actuation of the tire monitor 100.

The pressure sensor 402 forms a tire data sensor configured to produce data representative of a tire characteristic. In the illustrated embodiment, the pressure sensor 402 is a tire pressure sensor and the tire characteristic is pneumatic pressure of the tire. In other embodiments, the detected tire characteristic may be a tire temperature, number of tire rotations, or other characteristics. The pressure sensor 402 produces sensor data or a sensor signal indicative of the tire characteristic for provision to the controller 404.

The controller 404 controls operation of the tire monitor 100. In one embodiment, the controller 404 comprises a microcontroller and a memory for storing data and instructions for operating the tire monitor 100. In another embodiment, the controller 404 comprises an application specific integrated circuit (ASIC) which integrates in a single chip all of the necessary functionality for controlling the tire monitor 100. In particular, the controller 404 receives data or signals from the sensor 402 and formats this data as a message for transmission to a remote receiver. The message may also include identification information for the tire monitor 100.

The transmitter 406 receives the message from the controller 404 and, in conjunction with the antenna 412, transmits radio signals to a remote receiver. The transmitter 406, thus receives tire data from the controller, the tire data being indicative of a tire characteristic of a tire of a vehicle. The transmitter 406 uses the tire data to modulate a radio carrier signal. Any suitable type of modulation may be selected.

For use in a variety of tires, the transmitter 406 is configured to transmit tire data at one or more transmission frequencies within a passband of frequencies of the tire. The passband is defined by the physical construction and elements used in the construction of the tire. The transmitter is suitable for use in tires including runflat or metallic ply sidewall tires which include circumferentially positioned metallic strands of a predetermined length. That is, the metallic strands run from bead to bead of the tire along substantially the entire circumference of the tire. In one application, the transmitter 406 is configured to transmit at a transmission frequency related to the configuration of the metallic strands. In another embodiment, the transmitter 406 is configured to transmit at a transmission frequency having a wavelength substantially less than the predetermined length of the metallic strands of the tire. In a particular embodiment, the transmitter 406 is configured to transmit at a transmission frequency greater than 600 MHz. In another particular embodiment, the transmitter is configured to transmit at a transmission frequency in a range from 800 MHz to 1000 MHz. In general, the transmission frequency of the tire is selected to lie in a pass band of the tire's characteristic frequency response and outside attenuation bands of the frequency response.

The transmission frequency of the transmitter 406 may be set using the frequency control circuit 408. This circuit has an input 410 for controlling the frequency of the transmitter 406. The frequency control circuit 408 may comprise any suitable components required to tune or adjust the transmission frequency of the transmitter 406. These components may include, for example, passive components such as capacitors, resistors or inductors. In a digital implementation, these components may include digital logic elements for providing the necessary control signals to the transmitter 406. Preferably, the cost of the components including the frequency control circuit 408 and the transmitter 406 is minimized to reduce the overall manufacturing cost of the tire monitor 100.

In one embodiment, the transmission frequency of the transmitter 406 is chosen at the time of manufacture of the tire monitor 100. The tire monitor 100 may be matched with a particular brand or model of tire having a known characteristic frequency response. In such a case, the transmission frequency for the tire is chosen in relation to the characteristic frequency response of the tire. The transmission frequency is set so that the transmitter 406 transmits at a transmission frequency in a passband of the characteristic frequency response of the tire. Alternatively, the transmitter may be set to transmit tire data at one or more transmission frequencies within a passband of frequencies of the tire. In alternative embodiments, the transmission frequency of the transmitter 406 of the tire monitor 100 may be set at the time of installation of the tire monitor 100 in a tire. This would require some previous knowledge of the characteristic frequency response of the particular tire.

Possible transmission frequencies for the tire monitor 100 are controlled by several factors. These include the characteristic frequency response of the tire with which the tire monitor 100 is to be associated. These also include the available frequency spectrum, as controlled by regulatory bodies. For example, the 300 MHz range is an unlicensed, low power range as specified by the United States Federal Communications Commission. Other frequency bands, such as in the vicinity of 800 MHz may be used as well if available. In Europe, frequencies around 433 MHz and 868 MHz may be available for use as transmission frequencies in tire monitor systems. Further, the transmission power level permitted by regulatory bodies may be limited also. Thus, the tire monitor 100 is required to transmit at a particular transmission frequency and at a predetermined transmission power. Finally, as noted, a design goal for the tire monitor 100 is reduction of the cost of manufacturing the tire monitor, including reducing component costs. The transmission frequency may be chosen to minimize cost by selecting a transmission frequency for which transmitter, control and antenna components are minimized.

Figure 5:
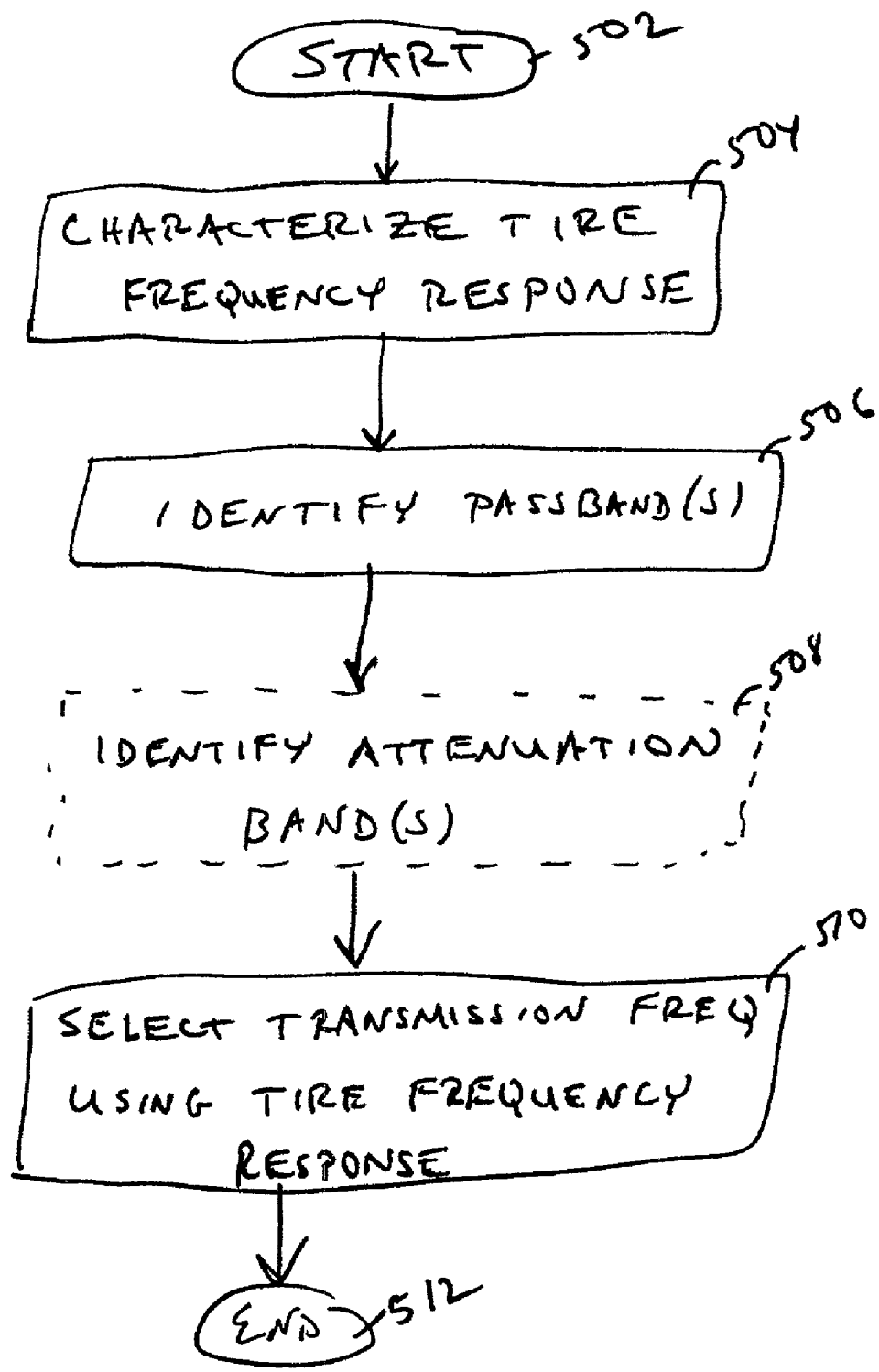
FIG. 5 is a flow diagram illustrating a method for selecting a transmission frequency in the tire monitor of FIG. 4.

FIG. 5 is a flow diagram illustrating a method for selecting a transmission frequency for a tire monitor for use with a tire. It is envisioned that the method will be performed once in conjunction with each model or type of tire. The characteristic frequency response for a tire is generally consistent for all tires having a common design, such as tires of the same tire model. Once a tire mode has been characterized, the selected transmission frequency may be then used for all tire monitors intended for use with that tire model. The method begins at block 502.

At block 504, the method includes characterizing frequency response of the tire to radio transmissions of selected frequencies. This may be done using a spectrum analyzer as described above or by any other suitable test set up. This may alternatively done using analytical methods to calculate or estimate the tire frequency response based on information about tire construction and materials. A plot of tire frequency response, such as the plot of FIG. 3, may be developed or alternatively data may be determined and stored for subsequent use.

At block 506, one or more passbands of frequencies are identified in the frequency response of the tire. Passbands correspond to frequencies at which transmitted radio energy from the tire monitor is not or is only minimally attenuated. A range of acceptable attenuation may be specified to define a passband as distinct from an attenuation band. In the optional block 508, attenuation bands of frequencies are identified in which energy transmitted by the tire monitor is unacceptably attenuated to prevent reliable reception at a remote receiver. One or both of the blocks 506, 508 may be performed to identify an acceptable transmission frequency for the tire monitor. These blocks may be performed using continuous data, such as the data used to draw the plot of FIG. 3, or using discrete data from individual measurements or calculations.

At block 510, the method includes selecting the transmission frequency for the tire monitor using the frequency response of the tire. This may include, for example, identifying one or more frequencies providing reliable transmission from the tire monitor to a remote receiver and tuning the tire monitor to transmit at the one or more frequencies. This block will typically include other considerations such as the availability of radio spectrum, the cost and availability of components suitable for transmitting at the selected frequency, power dissipation at the selected frequency, and other concerns as well.

After a transmission frequency has been selected, the method terminates at block 512. As noted, the selected frequency is preferably applied to all transmitters of tire monitors designated for tires of a particular model or manufactured by a particular manufacturer. Since attenuation of radio energy from a transmitter is related to tire construction and materials, a one-time selection of transmission frequency should be adequate. However, in some applications, it may be desirable to subsequently repeat the blocks of FIG. 5.

From the foregoing, it can be seen that an improved method and apparatus have been described for transmitting tire monitor data from a tire monitor associated with a wheel of a vehicle to a receiver of the vehicle. Each tire monitor in a tire monitor system detects a tire characteristic such as tire pressure. Each tire monitor produces tire data which is transmitted to a receiver of the system using a transmission frequency chosen in relation to the transmission characteristic frequency response of the tire. By tuning the transmission frequency to the tire's frequency response, attenuation of the transmitted power of the radio signal is minimized, ensuring reliable reception of the tire data at the receiver. Further, a lower transmit power may be used in the transmitter, thus extending the battery life of the battery which powers the tire monitor.

While a particular embodiment of the present invention has been shown and described, modifications may be made. For example, each tire monitor may adjust its transmission frequency in response to other characteristics of the radio frequency environment in which the tire monitor operates. Further, the method and apparatus described herein may be extended to use with any type of tire, not just metallic ply sidewall tires, to thereby optimize the performance of tire monitors used with other types of tires. It is therefore intended in the appended claims to cover all such changes and modifications which fall within the true spirit and scope of the invention.

What is claimed is:

1. A remote tire monitor system comprising:
   a plurality of tire monitors associated with wheels of a vehicle, each wheel including a tire having a previously determined characteristic frequency response including passband frequencies and attenuation band frequencies, each tire monitor including a transmitter configured to transmit tire data at a transmission frequency chosen in the passband frequencies of the characteristic frequency response of the tire; and
   a receiver configured to receive the tire data.

2. The remote tire monitor system of claim 1 wherein the transmitter transmits at a transmission frequency at which attenuation of transmitted power of a radio signal conveying the tire data is minimized.

3. The remote tire monitor system of claim 1 wherein the transmitter is tuned to transmit at one or more transmission frequencies selected for one of the tire and a model of the tire.

4. The remote tire monitor system of claim 1 where each tire monitor is mounted to a respective wheel of the vehicle inside a respective tire.

5. A tire monitor mountable inside a tire, the tire monitor comprising:
   a tire data sensor; and
   a transmitter configured to transmit tire data at one or more transmission frequencies chosen to be within a previously identified passband of frequencies of the tire wherein radio frequency energy is relatively slightly attenuated.

6. The tire monitor of claim 5 wherein the tire has a previously determined characteristic frequency response including one or more identified attenuation bands and one or more identified passbands, the characteristic frequency response related to the structure of the tire, the transmission frequency chosen to be in the one or more identified passbands.

7. The tire monitor of claim 6 wherein the tire includes radially positioned metallic strands of a predetermined length defining in part the characteristic frequency response of the tire, and wherein the transmitter is configured to transmit at a transmission frequency related to the configuration of the metallic strands.

8. The tire monitor of claim 6 wherein the tire includes circumferentially positioned metallic strands of a predetermined length and wherein the transmitter is configured to transmit at a transmission frequency having a wavelength substantially less than the predetermined length.

9. The tire monitor of claim 8 wherein the transmitter is configured to transmit at a transmission frequency greater than 600 MHz.

10. The tire monitor of claim 8 wherein the transmitter is configured to transmit at a transmission frequency in a range from 800 MHz to 1000 MHz.

11. The tire monitor of claim 5 wherein the tire is of a predetermined model and wherein the one or more transmission frequencies are chosen according to the predetermined model.

12. The tire monitor of claim 11 wherein the predetermined model has been characterized for frequency response, the frequency response including the passband of frequencies.

13. A method for operating a remote tire monitor system of a vehicle, the method comprising:
   producing tire data indicative of a tire characteristic of a tire of the vehicle; and
   using the tire data to modulate a radio carrier signal, the radio carrier signal having a transmission frequency chosen for reduced attenuation of the radio carrier signal by the tire.

14. The method of claim 13 further comprising: receiving the radio carrier signal; and
demodulating the radio carrier signal to recover the tire data.

15. The method of claim 13 further comprising:
transmitting the radio carrier signal at a predetermined transmission power.

16. A method for selecting a transmission frequency for a tire monitor for use with a tire, the tire monitor communicating tire data to a remote receiver when mounted on the tire, the method comprising:
characterizing frequency response of the tire to radio transmissions of selected frequencies; and
selecting a transmission frequency for the tire monitor by using the frequency response of the tire to identify one or more frequencies having reduced attenuation of the radio transmissions and selecting the transmission frequency from among the one or more frequencies.

17. The method of claim 16 wherein characterizing the frequency response of the tire comprises:
identifying at least one attenuation band of frequencies of the tire; and
selecting the transmission frequency outside the at least one attenuation band of frequencies.

18. The method of claim 16 wherein characterizing the frequency response of the tire comprises:
identifying at least one passband of frequencies of the tire; and
selecting the transmission frequency within the at least one passband band of frequencies.

19. The method of claim 16 further comprising:
associating the selected transmission frequency with a tire model of the tire; and
selecting the transmission frequency for substantially all tire monitors for use with substantially all tires of the tire model.

20. The method of claim 16 wherein selecting a transmission frequency comprises:
identifying one or more frequencies providing reliable transmission from the tire monitor to the remote receiver; and
tuning the tire monitor to transmit at the one or more frequencies.

21. A remote tire monitor system for a vehicle having a plurality of wheels, the remote tire monitor system comprising:
one or more tire monitors, each respective tire monitor being associated with a tire of a respective wheel of the vehicle, the tire having a previously determined characteristic frequency response to electromagnetic energy imparted on the tire, each respective tire monitor including
a respective tire data sensor, and
a respective radio transmitter coupled with the tire data sensor and configured to transmit electromagnetic energy to convey tire data, the respective radio transmitter transmitting the electromagnetic energy at one or more transmission frequencies chosen in relation to the characteristic frequency response of the tire; and
a receiver configured to detect the transmitted electromagnetic energy.

22. The remote tire monitor system of claim 21 wherein the respective radio transmitter transmits the electromagnetic energy at transmission frequencies chosen to be in a previously identified passband of the characteristic frequency response of the tire.

23. A tire monitor mountable inside a tire of a vehicle, the tire monitor comprising:
a tire data sensor to produce data indicative of a tire condition; and
a transmit circuit coupled with the tire data sensor to transmit tire data at one or more transmission frequencies chosen to be within a previously identified passband of frequencies of a previously determined characteristic frequency response to electromagnetic energy imparted on the tire.

* * * * *